June 20, 1961 L. SCHENKMAN 2,989,318
COLLAPSIBLE BABY CARRIAGE
Filed Nov. 13, 1959 6 Sheets-Sheet 1

INVENTOR.
LIBBY SCHENKMAN
BY Ostrolenk, Faber,
Gerb & Soffen
ATTORNEYS

June 20, 1961 L. SCHENKMAN 2,989,318
COLLAPSIBLE BABY CARRIAGE
Filed Nov. 13, 1959 6 Sheets-Sheet 3

INVENTOR.
LIBBY SCHENKMAN
BY Ostrolenk, Faber,
Gerb & Soffen
ATTORNEYS

INVENTOR.
LIBBY SCHENKMAN

INVENTOR.
LIBBY SCHENKMAN

ATTORNEYS

June 20, 1961 L. SCHENKMAN 2,989,318
COLLAPSIBLE BABY CARRIAGE
Filed Nov. 13, 1959 6 Sheets-Sheet 6

INVENTOR.
LIBBY SCHENKMAN
BY
ATTORNEYS

United States Patent Office 2,989,318
Patented June 20, 1961

2,989,318
COLLAPSIBLE BABY CARRIAGE
Libby Schenkman, 1109 18th St., Greeley, Colo.
Filed Nov. 13, 1959, Ser. No. 852,660
15 Claims. (Cl. 280—41)

This invention relates to collapsible baby carriages and more particularly to a collapsible carriage so arranged that the folding and raising elements depend entirely upon the use of a simple slide bar or equivalent structure which carries all the necessary supports for opening and closing the carriage.

This novel carriage is so arranged that it may be utilized as an ordinary carriage with a back rest which may be raised into supporting position or lowered out of the way; it may be partially collapsed into the form of a car-bed; it may also be partially collapsed into the form of a stroller and may be fully collapsed for carrying into the approximate size and shape of a flat shopping bag.

While this invention is initially directed to the concept of a collapsible baby carriage, it may also be applied to the concept of a stroller in which, in effect, a collapsible moving chair on wheels with appropriate handle is provided.

An object of this novel collapsible baby carriage is that it is so arranged that it may readily be collapsed by a single motion from the erected position to the collapsed position and may again be re-erected to the extended position by a single one hand motion. Even when collapsed, other carriages constitute a bulky structure which, while making storage a little simpler than when non-collapsible types are used, still do not allow convenient carrying about.

The primary object of this invention is the provision of a novel collapsible baby carriage and stroller structure so arranged that it may be collapsed in two planes, that is, the vertical thickness or spacing of the elements will be greatly reduced and the entire structure will at the same time bend in the middle to decrease its bulk, so that a full size baby carriage will collapse to a structure approximating the size of an ordinary shopping bag.

The foregoing and many other objects of this invention will become more apparent in the following description and drawings, in which.

Figure 1:
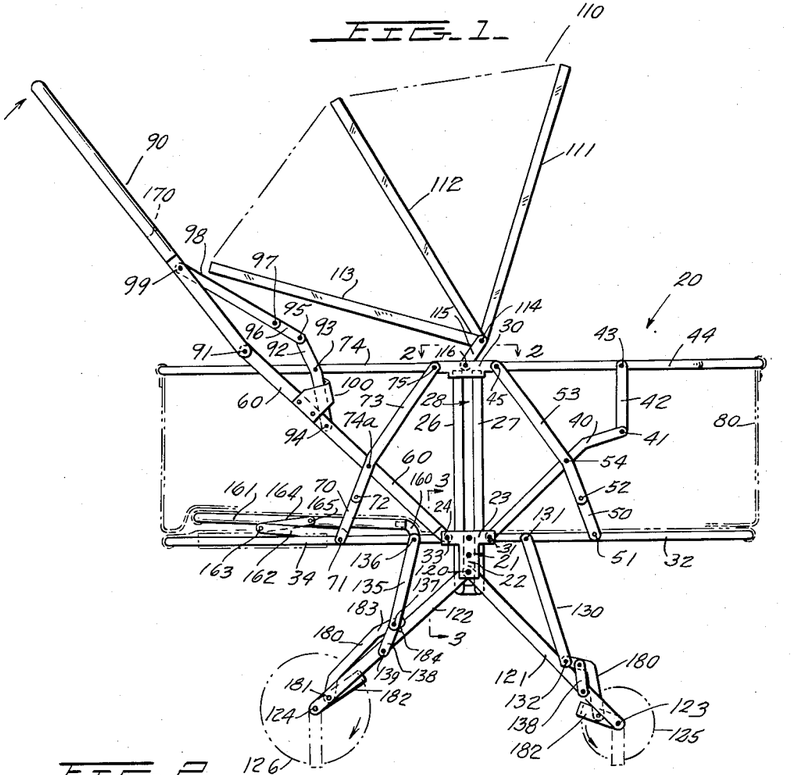
FIGURE 1 is a side view of the novel baby carriage fully erected.
Figure 2:
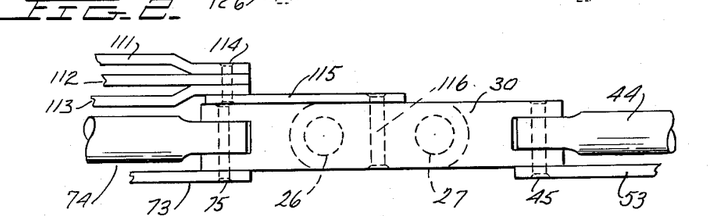
FIGURE 2 is a view partly in cross-section and taken from line 2—2 of FIGURE 1 looking in the direction of the arrows.

Referring first to FIGURE 1, the novel carriage 20 is provided with a set of collapsible supporting linkages of which the essential element is a T-bar 21 having a vertical arm 22 and side arms 23 and 24. The T-bar 21 is provided with an inward projection 25 (see also FIGURE 3) which rides between the vertical bars 26 and 27 entering into the slot 28 between them. The bars 26 and 27 are connected together at the top by a cross-head 30 which is secured to the bars 26 and 27 in any suitable manner, and the bars 26 and 27 are also interconnected at their lower end in any suitable manner.

Figure 3:
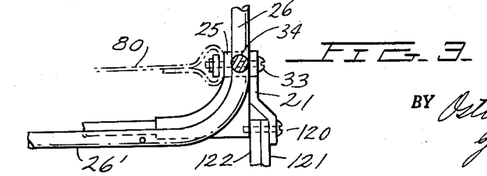
FIGURE 3 is a view partly in cross-section taken from line 3—3 of FIGURE 1 looking in the direction of the arrows.

In one form the bars 26 and 27 may be extended, as shown at 26' in FIGURE 3, under the carriage to connect with similar bars on the opposite side. The T-member 21 is vertically slidable in the slot 28 between bars 26 and 27. It will be obvious that the slot 28 may be provided as a slot in an integral member of which the side elements correspond to members 26 and 27, or a single tubing with slidable collar corresponding to 21 with frame members attached may be used, also a channel structure may be used, or other equivalent structures. This is a matter of choice of design and construction.

The arm 23 of the T-bar 21 on one side is connected by pivot 31 to the front carriage bed support frame 32 which may be a U-shaped frame and the other end of which is similarly connected to an identical T-bar on the other side of the carriage. Arm 24 of the T-bar is connected by pivot 33 to the U-shaped carriage bed frame 34, the opposite end of which is similarly connected to the T-bar on the other side of the carriage.

Link 40 on each side of the carriage is also connected to pivot 31 of T-bar 21. Link 40 at its opposite end is connected by pin 41 to link 42 which in turn is connected by pin 43 to the U-shaped top frame 44. One end of U-shaped top frame 44 is connected by pin 45 to cross-head 30. The opposite end of frame 44 is similarly connected to the cross-head on the other side of the carriage.

Link 50 is connected by pin 51 on each side to the front bed frame 32. The opposite end of link 50 is connected by pin 52 to link 53; the other end of link 53 is connected by pin 45 to the cross-head 30. Links 40 and 53 are interconnected in toggle relation by pin 54.

To a substantial extent, with differences hereinafter pointed out, the linkages are repeated at the rear of the carriage; that is: link 60, which carries both the locking device and the hand bar, is connected at its lower end to pin 33 carried by T-bar 21. Link 70 is connected by pin 71 to the rear bed support frame 34 and is connected at its opposite end by pin 72 to link 73 which in turn is connected by pin 75 of cross-bar 30 to which the rear U-shaped top support bar 74 is also connected. Link 73 intersects link 60 and is connected thereto in toggle relation by pin 74a. The webbing 80 is supported from the top U-shaped frame members 44 and 74 and may be connected to lower elements of the frame as desired, as for instance, to the slide element 25 (see FIGURE 3) on each side. Instead of webbing, a flat member may be mounted on the lower elements.

The handle bar link 60 on each side is connected to the U-shaped handle bar structure 90 by pivot pin 91. Link 92 is pivotally connected to the frame 74 on each side by pin 93. Link 92 is connected at its lower end by pin 94 to handle bar link 60. At its upper end, link 92 is connected by pin 95 to link 96, the opposite end of link 96 is connected by pin 97 to link 98 and the other end of link 98 is connected by pin 99 on each side to the handle bar 90.

When the carriage is erected the spring snap lock 100, which is rigidly secured to the handle bar link 60, latches to the link 92. This prevents the angle between link 92 and link 60 from increasing and thereby locks the entire structure in erected position. Just prior to the desired collapse of the structure, snap lock 100 is manually operated to disengage the link 92 on each side. This now permits the link 92 to rotate in a direction to increase the angle between links 60 and 92 and thereby permits collapse of the structure.

Before however describing collapse of the baby carriage itself it will be pertinent to describe the method of wheel attachment which also permits collapse and the method of hood attachment.

The hood 110 is spread across three U-shaped bars 111, 112, 113 which have a common pivot on each side at pin 114 on link 115. Link 115 on each side is pivotally connected by pivot 116 to the center of crossbar 30. The hood elements 111, 112 and 113 are rotatable about pivot 114 to nest within each other to erect or collapse the hood; and the hood, when collapsed, as shown in FIGURE 4, may pivot around pivot 116 to lie against the U-shaped frame member 74.

The lower end of arm 22 of T-bar 21 on each side is connected by pivot 120 to wheel carrying links 121 and 122 on each side. At the lower end are mounted the axles 123, 124 for supporting the wheels 125, 126 on each side. Link 130 is connected from pivot 131 on frame 32 to pivot 132 on link 121. Link 135 is connected from pivot 136 on frame 34 on each side to pivot 137 which is connected by link 138 to pivot 139 on the wheel support link 122. Other linkages on the wheels have functions which will be later described; these linkages are not now necessary for the full understanding of the simple collapse of the carriage.

Figure 4:
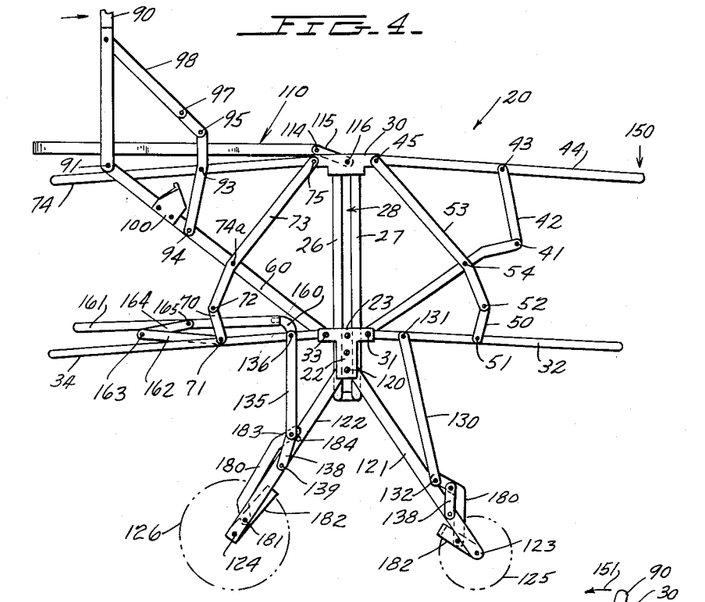
FIGURE 4 is a side view of the frame members of the carriage of FIGURE 1 showing the initiation of collapse.
Figures 5, 6:
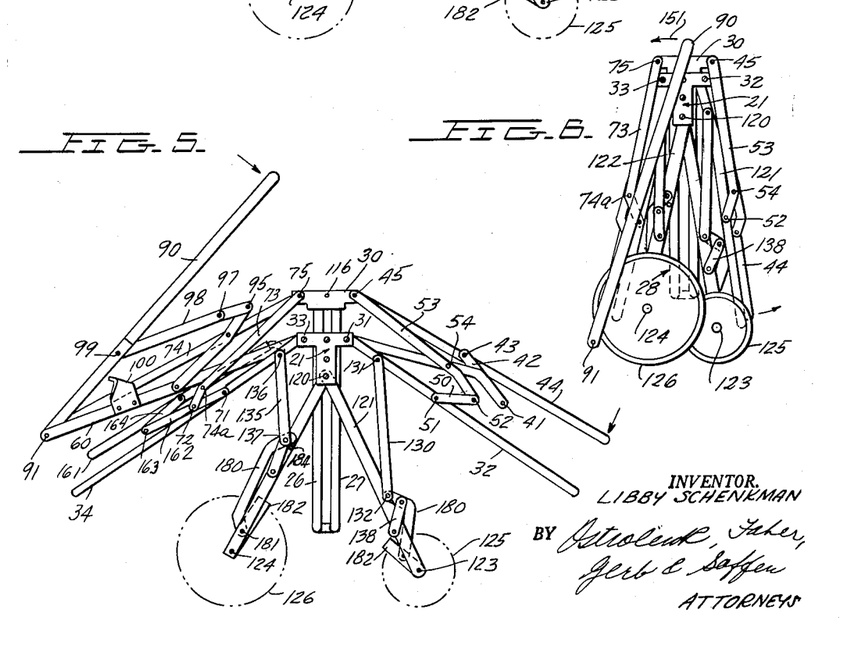
FIGURE 5 is a side view of the structure of FIGURES 1 and 4 showing a further collapsing operation.
FIGURE 6 is a side view of the frame members of FIGURES 1, 4 and 5 showing the structure fully collapsed.

As seen by a comparison of FIGURES 1–4, when the latch 100 is released, link 92 may now rotate in a clockwise direction around its pivot 93 to increase the angle between link 92 and handle-bar link 60 from a sharp acute angle as in FIGURE 1, through a larger angle as in FIGURE 4, to an obtuse angle as in FIGURE 5, to a virtually straight angle as in FIGURE 6. The release of link 92 now makes it possible to rotate all of the links.

The handle-bar 90 may now be rotated about its pivot 91 with a forward and downward movement which will result in rotation of all of the linkages toward the plane of bars 26 and 27 from the position of FIGURE 4, through the position of FIGURE 5 and to the position of FIGURE 6. Simultaneously, downward pressure at area 150 of FIGURE 4 will result in corresponding downward rotation of all of the elements on that side from the position of FIGURE 4, through the position of FIGURE 5 and to the position of FIGURE 6; actually such simultaneous pressure is not essential at area 150 since operation toward collapse at one end inherently produces collapse at the other end, but such simultaneous pressure can be used to facilitate collapse.

After the latch 100 has been released, the downward movement of the elements on one side will necessarily cause the T-bar 21 to rise, with respect to bars 26 and 27, thereby effecting simultaneous collapse of the other side. The simplest operation however is achieved by rotating the handle-bar 90 forward, with a slight downward pressure on one side, while simultaneously pressing down with a slight pressure at the area 150 on the other side.

Re-erection of the carriage becomes a very simple matter. The user need merely place his hand at the cross-bar area 30 of FIGURE 6 and swing the handle upwardly and rearwardly in the direction indicated by the arrow 151. This will cause the linkages on the left side to expand from the position of FIGURE 6, through the position of FIGURE 5 and the position of FIGURE 4, to the position of FIGURE 1. A swift movement of this type will thus cause the T-bar 21 to travel upwardly in the slot 28 between bars 26 and 27 and cause all elements to move to the position of FIGURE 1 where the engagement of latch 100 with link 92 will lock the carriage in erected position.

By this means, therefore, a simplified operation is provided wherein the carriage may be collapsed to virtually shopping bag size where its maximum dimension will be half of its length and where the maximum thickness of the collapsed unit will be approximately 1½ times a wheel diameter.

It will be noted that the wheel axles are so arranged that the wheels extend slightly beyond the width of the carriage so that the carriage elements when collapsed may extend between the wheels.

Figure 7:
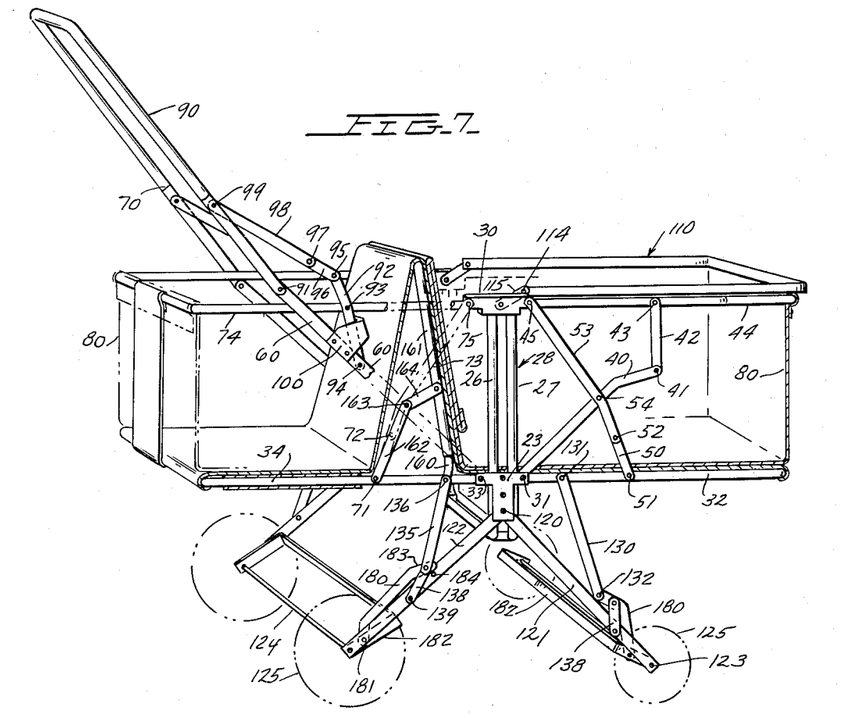
FIGURE 7 is a side view of the structure of FIGURES 1–6 showing the frame members arranged for a two-seater arrangement of the novel carriage.

This novel carriage may also be arranged as a two-seater unit as shown by a comparison of FIGURES 1, 4 and 7. Curved link 160, connected to the inside of frame 34 by pin 136, is connected to the U-shaped frame member 161 on each side. The opposite end of link 162 is connected to the approximate mid-point 163 of link 164 which in turn is connected at point 165 to member 161. Links 162 and 164 are arranged so that when member 161 is rotated from the position of FIGURE 1 to the position of FIGURE 7, links 162 and 164 will travel over center and lock, thereby providing a partition between two sections of the carriage and providing a two-seater arrangement in which the second seat is a separate stroller which is brought into position as the back is raised. This second section may, if desired, be a shopping bag section.

Figure 8:
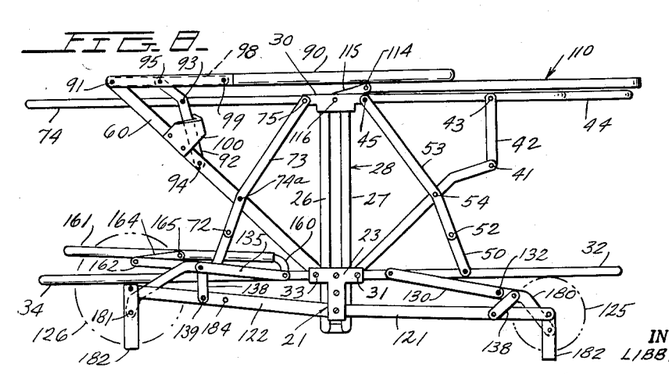
FIGURE 8 is a view of the frame members of the unit of FIGURE 1 showing the wheels collapsed upwardly and the handle turned to form a car-bed.
Figure 9:
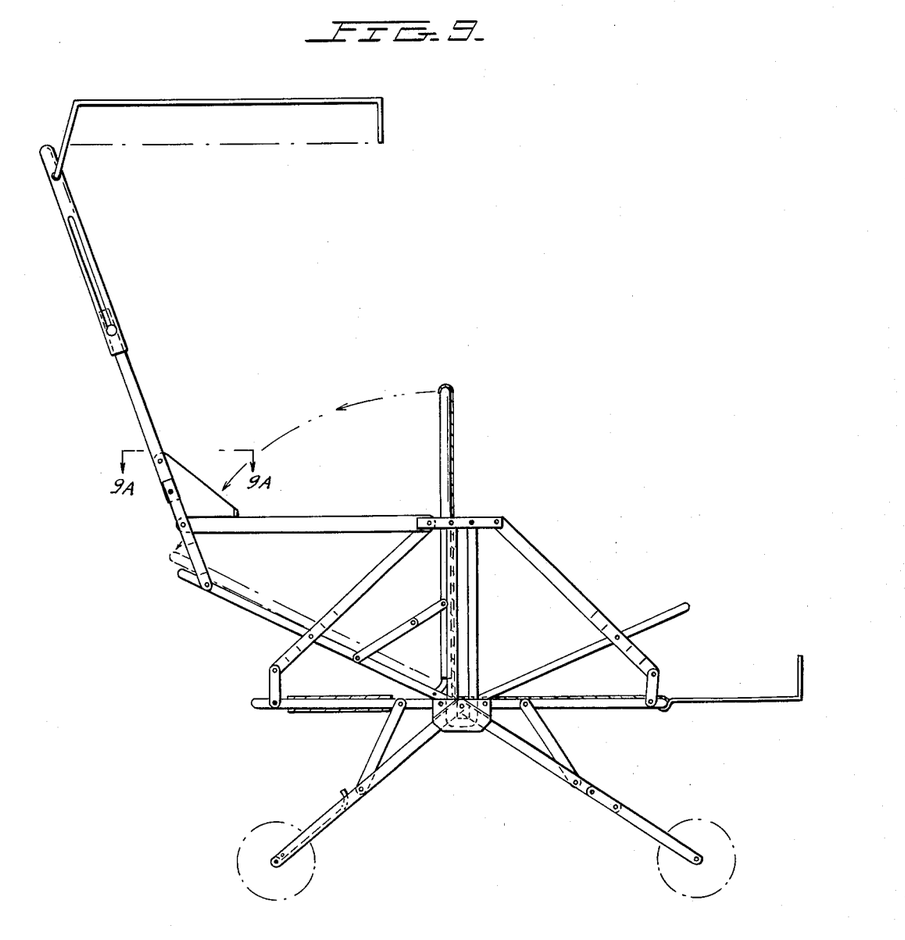
FIGURES 9, 9A, 10, and 11 are views of my invention as applied to a stroller.
Figure 9A:
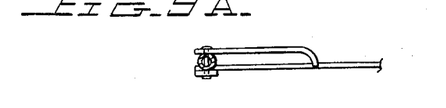
Figure 10:
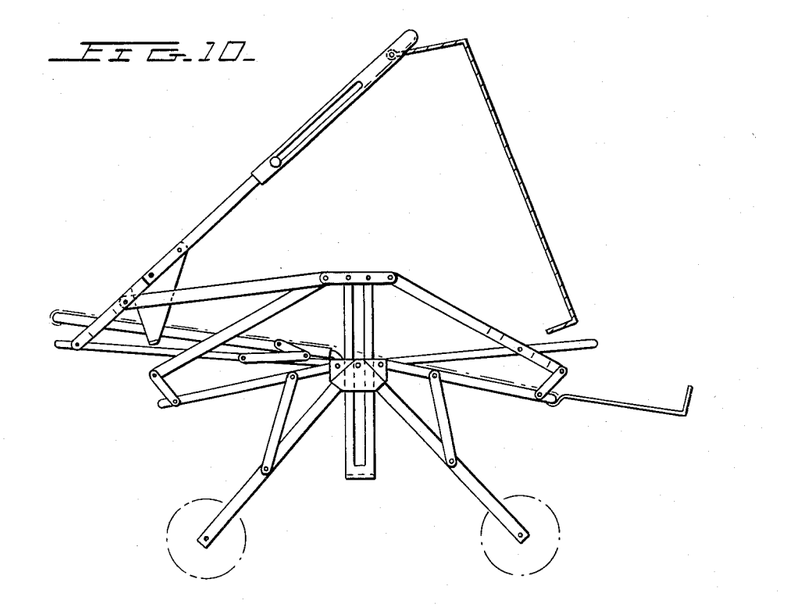
Figure 11:
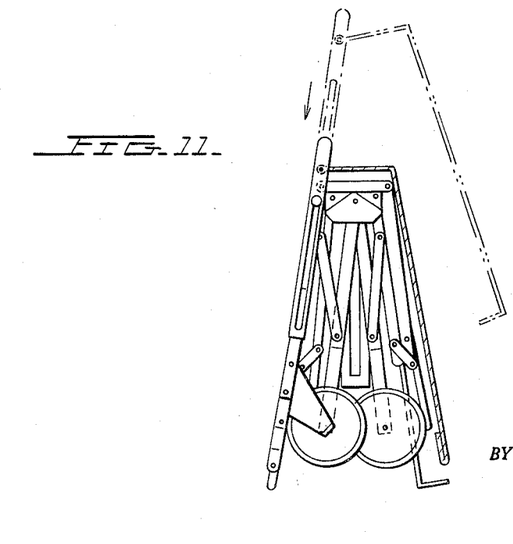
Figure 12:
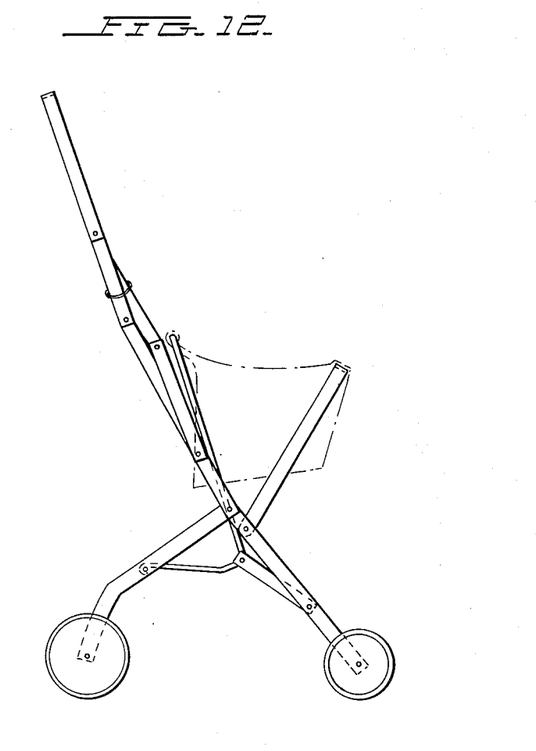
FIGURES 12 and 13 are views of my invention as applied to a modified form of stroller.
Figure 13:
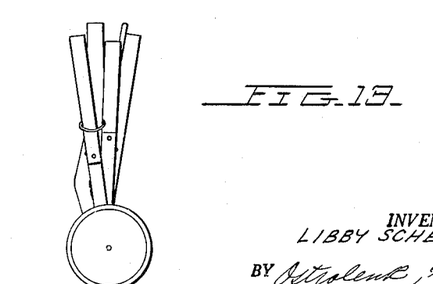

The wheel linkages are so arranged as will be apparent from a comparison of FIGURES 1, 7 and 8 that when desired the wheels may be collapsed upwardly toward the carriage body and the handle may be folded at pin 91 to turn the unit into a car-bed.

The handle 90 may be telescopic in arrangement, as shown by the dotted line 170 of FIGURE 1, so that collapse may occur to the smallest possible dimension when the carriage structure is arranged as a stroller device.

Returning to the collapse of the wheels, as shown by a comparison of FIGURES 1 and 8, the rear wheel link 122, which is supported by links 135 and 138, is maintained in operative position by the over-center toggle link 180. The over-center toggle link is pivotally supported on pin 181 on support link 182 and in the extended position of the rear wheel, as shown in FIGURE 1, maintains the end 183 of toggle link 180 over-center against stop pin 184 on link 122. When member 183 is manually grasped and rotated toward the handle bar or when a downward foot pressure is applied to member 182, support is removed from the pivot 137 to which a toggle link 180 is connected and pulls this pivot 137 toward the left, breaking the linkage 135—138 and permitting link 122 on each side to be rotated upwardly and collapse the wheels on the left side. A similar arrangement is provided for the front wheels.

While this invention has been shown as applicable to collapsible baby carriages, it will be obvious that with rearrangement and re-dimensioning of parts, the same principle may be applicable to a baby stroller as well as to collapsible structures including tables and chairs.

In the foregoing the invention has been described solely in connection with preferred illustrative embodiments thereof. Since many variations and modifications of the invention will now be obvious to those skilled in the art, it is preferred that the scope thereof be determined not by the specific disclosures herein contained, but only by the appended claims.

I claim:

1. A collapsible frame comprising a slide track and a slide member slidable in said slide track; frame members extending substantially normally to said slide track and pivotally connected to said slide member; said slide member being located at one end of said slide track when the frame is erected; a support member at the opposite end of said slide track; additional frame members extending substantially normally to said slide track and pivotally connected to said support member; linkages connecting said first mentioned frame members to said additional frame members and to said support member; said linkages being extended when said slide member is moved away from said support member and being collapsed to rotate said frame members and additional frame members toward the plane of said slide track when the slide member is moved toward said support member.

2. A collapsible frame comprising a vertical slide track and a slide member slidable vertically in said slide track; frame members extending substantially normally to said slide track and pivotally connected to said slide member; said slide member being located at one end of said slide track when the frame is erected; a support member at the opposite end of said slide track; additional frame members extending substantially normally to said slide track and pivotally connected to said support member; linkages connecting said first mentioned frame members to said additional frame members and to said support member; said linkages being extended when said slide member is moved away from said support member and being collapsed to rotate said frame members and additional frame members toward the plane of said slide track when the slide member is moved toward said support member.

3. A collapsible frame comprising a vertical slide track and a slide member slidable vertically in said slide track; frame members extending substantially normally to said slide track and pivotally connected to said slide member; said slide member being located at one end of said slide track when the frame is erected; a support member at the opposite end of said slide track; additional frame members extending substantially normally to said slide track and pivotally connected to said support member; linkages connecting said first mentioned frame members to said additional frame members and to said support member; said linkages being extended when said slide member is moved away from said support member and being collapsed to rotate said frame members and additional frame members toward the plane of said slide track when the slide member is moved toward said support member; said frame members and corresponding linkages extending on each side of said slide track, slide member and said support member.

4. A collapsible frame comprising a vertical slide track and a slide member slidable vertically in said slide track; frame members extending substantially normally to said slide track and pivotally connected to said slide member; said slide member being located at one end of said slide track when the frame is erected; a support member at the opposite end of said slide track; additional frame members extending substantially normally to said slide track and pivotally connected to said support member; linkages connecting said first mentioned frame members to said additional frame members and to said support member; said linkages being extended when said slide member is moved away from said support member and being collapsed to rotate said frame members and additional frame members toward the plane of said slide track when the slide member is moved toward said support member; said frame members and corresponding linkages extending on each side of said slide track, slide member and said support member; one of the elements of said linkages being extended to form a handle for said frame.

5. A collapsible frame comprising a vertical slide track and a slide member slidable vertically in said slide track; frame members extending substantially normally to said slide track and pivotally connected to said slide member; said slide member being located at one end of said slide track when the frame is erected; a support member at the opposite end of said slide track; additional frame members extending substantially normally to said slide track and pivotally connected to said support member; linkages connecting said first mentioned frame members to said additional frame members and to said support member; said linkages being extended when said slide member is moved away from said support member and being collapsed to rotate said frame members and additional frame members toward the plane of said slide track when the slide member is moved toward said support member; said frame members and corresponding linkages extending on each side of said slide track, slide member and said support member; one of the elements of said linkages being extended to form a handle for said frame; said handle being telescopic.

6. A collapsible frame comprising a vertical slide track and a slide member slidable vertically in said slide track; frame members extending substantially normally to said slide track and pivotally connected to said slide member; said slide member being located at one end of said slide track when the frame is erected; a support member at the opposite end of said slide track; additional frame members extending substantially normally to said slide track and pivotally connected to said support member; linkages connecting said first mentioned frame members to said additional frame members and to said support member; said linkages being extended when said slide member is moved away from said support member and being collapsed to rotate said frame members and additional frame members toward the plane of said slide track when the slide member is moved toward said support member; said frame members and corresponding linkages extending on each side of said slide track, slide member and said support member; one of the elements of said linkages carrying a releasable latch member; a rotatable latch link connected to one of said frame members; the interengagement of said latch and said latch link locking said latch link against rotation; said latch link being also connected to said one of the elements of said linkage; the locking of said latch link locking said linkages in the erected position of the frame.

7. A collapsible frame comprising a vertical slide track and a slide member slidable vertically in said slide track; frame members extending substantially normally to said slide track and pivotally connected to said slide member; said slide member being located at one end of said slide track when the frame is erected; a support member at the opposite end of said slide track; additional frame members extending substantially normally to said slide track and pivotally connected to said support member; linkages connecting said first mentioned frame members to said additional frame members and to said support member; said linkages being extended when said slide member is moved away from said support member and being collapsed to rotate said frame members and additional frame members toward the plane of said slide track when the slide member is moved toward said support member; said frame members and corresponding linkages extending on each side of said slide track, slide member and said support member; one of the elements of said linkages carrying a releasable latch member; a rotatable latch link connected to one of said frame members; the interengagement of said latch and said latch link locking said latch link against rotation; said latch link being also connected to said one of the elements of said linkage; the locking of said latch link locking said linkages in the erected position of the frame; said one of the elements of said linkages also supporting a handle for said frame.

8. A collapsible frame comprising a vertical slide track and a slide member slidable vertically in said slide track; frame members extending substantially normally to said slide track and pivotally connected to said slide member; said slide member being located at one end of said slide track when the frame is erected; a support member at the opposite end of said slide track; additional frame members extending substantially normally to said slide track and pivotally connected to said support member; linkages connecting said first mentioned frame members to said additional frame members and to said support member; said linkages being extended when said slide member is moved away from said support member and being collapsed to rotate said frame members and additional frame members toward the plane of said slide track when the slide member is moved toward said support member; said frame members and corresponding linkages extending on each side of said slide track, slide member and said support member; downward pressure on the ends of the frame members causing said frame members to rotate toward the plane of the slide member and wheel support links rotatably connected to said slide member, said links also being connected by additional links to the frame members rotatably connected to said slide member; rotation of said frame members toward the plane of said slide track rotating said wheel support links toward the plane of said slide track to effect complete collapse of said frame.

9. A collapsible frame comprising a vertical slide track and a slide member slidable vertically in said slide track; frame members extending substantially normally to said slide track and pivotally connected to said slide member; said slide member being located at one end of said slide track when the frame is erected; a support member at the opposite end of said slide track; additional frame members extending substantially normally to said slide track and pivotally connected to said support member; linkages connecting said first mentioned frame members to said additional frame members and to said support member; said linkages being extended when said slide member is moved away from said support member and being collapsed to rotate said frame members and additional frame members toward the plane of said slide track when the slide member is moved toward said support member; said frame members and corresponding linkages extending on each side of said slide track, slide member and said support means; downward pressure on the ends of the frame members causing said frame members to rotate toward the plane of the slide member and wheel support links rotatably connected to said slide member, said links also being connected by additional links to the frame members rotatably connected to said slide member; rotation of said frame members toward the plane of said slide track rotating said wheel support links toward the plane of said slide track to effect complete collapse of said frame; said last mentioned additional links being arranged in toggle relation and operable to permit rotation of the wheel links away from the plane of the slide track to move the wheels toward the frame members.

10. A carriage having a collapsible frame comprising a vertical slide track and a slide member slidable vertically in said slide track; frame members extending substantially normally to said slide track and pivotally connected to said slide member; said slide member being located at one end of said slide track when the frame is erected; a support member at the opposite end of said slide track; additional frame members extending substantially normally to said slide track and pivotally connected to said support member; linkages connecting said first mentioned frame members to said additional frame members and to said support member; said linkages being extended when said slide member is moved away from said support member and being collapsed to rotate said frame members and additional frame members toward the plane of said slide track when the slide member is moved toward said support member; said frame members and corresponding linkages extending on each side of said slide track, slide member and said support member; one of the elements of said linkages carrying a releasable latch member; a rotatable latch link connected to one of said frame members; the interengagement of said latch and said latch link locking said latch link against rotation; said latch link being also connected to said one of the elements of said linkage; the locking of said latch link locking said linkages in the erected position of the frame; said one of the elements of said linkages also supporting a handle for said frame; downward pressure on the ends of the frame members causing said frame members to rotate toward the plane of the slide member and wheel support links rotatably connected to said slide member, said links also being connected by additional links to the frame members rotatably connected to said slide member; rotation of said frame members toward the plane of said slide track rotating said wheel support links toward the plane of said slide track to effect complete collapse of said frame; said last mentioned additional links being arranged in toggle relation and operable to permit rotation of the wheel links away from the plane of the slide track to move the wheels toward the frame members.

11. A carriage having a collapsible frame comprising a vertical slide track and a slide member slidable vertically in said slide track; frame members extending substantially normally to said slide track and pivotally connected to said slide member; said slide member being located at one end of said slide track when the frame is erected; a support member at the opposite end of said slide track; additional frame members extending substantially normally to said slide track and pivotally connected to said support member; linkages connecting said first mentioned frame members to said additional frame members and to said support member; said linkages being extended when said slide member is moved away from said support member and being collapsed to rotate said frame members and additional frame members toward the plane of said slide track when the slide member is moved toward said support member; said frame members and corresponding linkages extending on each side of said slide track, slide member and said support member; one of the elements of said linkages carrying a releasable latch member; a rotatable latch link connected to one of said frame members; the interengagement of said latch and said latch link locking said latch link against rotation; said latch link being also connected to said one of the elements of said linkage; the locking of said latch link locking said linkages in the erected position of the frame; said one of the elements of said linkages also supporting a handle for said frame; downward pressure on the ends of the frame members causing said frame members to rotate toward the plane of the slide member and wheel support links rotatably connected to said slide member, said links also being connected by additional links to the frame members rotatably connected to said slide member; rotation of said frame members toward the plane of said slide track rotating said wheel support links toward the plane of said slide track to effect complete collapse of said frame; said last mentioned additional links being arranged in toggle relation and operable to permit rotation of the wheel links away from the plane of the slide track to move the wheels toward the frame members and an additional frame rotatably connected to one of the frame members connected to the slide member, said additional frame being rotatable from a horizontal to a vertical position to divide the carriage body into two sections.

12. A carriage having a collapsible frame comprising a vertical slide track and a slide member slidable vertically in said slide track; frame members extending substantially normally to said slide track and pivotally connected to said slide member; said slide member being located at one end of said slide track when the frame is erected; a support member at the opposite end of said slide track; additional frame members extending substantially normally to said slide track and pivotally connected to said support member; linkages connecting said first mentioned frame member to said additional frame members and to said support member; said linkages being extended when said slide member is moved away from said support member and being collapsed to rotate said frame members and additional frame members toward the plane of said slide track when the slide member is moved toward said support member; said frame members and corresponding linkages extending on each side of said slide track, slide member and said support member; one of the elements of said linkages carrying a releasable latch member; a rotatable latch link connected to one of said frame members; the interengagement of said latch and said latch link locking said latch link against rotation; said latch link being also connected to said one of the elements of said linkage; the locking of said latch link locking said linkages in the erected position of the frame; said one of the elements of said linkages also supporting a handle for said frame; downward pressure on the ends of the frame members causing said frame members to rotate toward the plane of the slide member and wheel support links rotatably connected to said slide member, said links also being connected by additional links to the frame members rotatably connected to said slide member; rotation of said frame members toward the plane of said slide track rotating said wheel support links toward the plane of said slide track to effect complete collapse of said frame; said last mentioned additional links being arranged in toggle relation and operable to permit rotation of the wheel links away from the plane of the slide track to move the wheels toward the frame members and a collapsible hood pivotally connected to said support member.

13. A collapsible frame comprising a vertical slide track and a slide member slidable vertically in said slide track; frame members extending substantially normally to said slide track and pivotally connected to said slide member; said slide member being located at one end of said slide track when the frame is erected; additional frame members extending substantially normally to said slide track and pivotally connected to said opposite end of said slide track; linkages connecting said first mentioned frame members to said additional frame members and to said opposite end of said slide track; said linkages being extended when said slide member is moved away from said opposite end of said slide track and being collapsed to rotate said frame members and additional frame members toward the plane of said slide track when the slide member is moved toward said opposite end of said slide track; said frame members and corresponding linkages extending on each side of said slide track, slide member and said opposite end of said slide track; one of the elements of said linkages carrying a releasable latch member; a rotatable latch link connected to one of said frame members; the interengagement of said latch and said latch link locking said latch link against rotation; said latch link being also connected to said one of the elements of said linkage; the locking of said latch link locking said linkages in the erected position of the frame.

14. A collapsible frame comprising a vertical slide track and a slide member slidable vertically in said slide track; frame members extending substantially normally to said slide track and pivotally connected to said slide member; said slide member being located at one end of said slide track when the frame is erected; additional frame members extending substantially normally to said slide track and pivotally connected to said opposite end of said slide track; linkages connecting said first mentioned frame members to said additional frame members and to said opposite end of said slide track; said linkages being extended when said slide member is moved away from said opposite end of said slide track and being collapsed to rotate said frame members and additional frame members toward the plane of said slide track when the slide member is moved toward said opposite end of said slide track; said frame members and corresponding linkages extending on each side of said slide track, slide member and said opposite end of said slide track; one of the elements of said linkages carrying a releasable latch member; a rotatable latch link connected to one of said frame members; the interengagement of said latch and said latch link locking said latch link against rotation; said latch link being also connected to said one of the elements of said linkage; the locking of said latch link locking said linkages in the erected position of the frame; said one of the elements of said linkages also supporting a handle for said frame.

15. A collapsible frame comprising a vertical slide track and a slide member slidable vertically in said slide track; frame members extending substantially normally to said slide track and pivotally connected to said slide member; said slide member being located at one end of said slide track when the frame is erected; additional frame members extending substantially normally to said slide track and pivotally connected to said opposite end of said slide track; linkages connecting said first mentioned frame members to said additional frame members and to said opposite end of said slide track; said linkages being extended when said slide member is moved away from said opposite end of said slide track and being collapsed to rotate said frame members and additional frame members toward the plane of said slide track when the slide member is moved toward said opposite end of said slide track; said frame members and corresponding linkages extending on each side of said slide track, slide member and said opposite end of said slide track; downward pressure on the ends of the frame members causing said frame members to rotate toward the plane of the slide member and wheel support links rotatably connected to said slide member, said links also being connected by additional links to the frame members rotatably connected to said slide member; rotation of said frame members toward the plane of said slide track rotating said wheel support links toward the plane of said slide track to effect complete collapse of said frame; said last mentioned additional links being arranged in toggle relation and operable to permit rotation of the wheel links away from the plane of the slide track to move the wheels toward the frame members.

References Cited in the file of this patent

UNITED STATES PATENTS

| | | |
|---|---|---|
| 1,158,507 | Kolb | Nov. 2, 1915 |
| 1,234,510 | Trautwein | July 24, 1917 |
| 1,599,505 | Wheatley | Sept. 14, 1926 |
| 2,449,618 | Pritchard | Sept. 21, 1948 |

FOREIGN PATENTS

| | | |
|---|---|---|
| 640,023 | France | Mar. 19, 1928 |